(12) United States Patent
Smith et al.

(10) Patent No.: US 7,886,281 B2
(45) Date of Patent: Feb. 8, 2011

(54) SYSTEM AND METHODS FOR CROSS-TIER TRANSACTION TRACING

(75) Inventors: Steven Smith, Austin, TX (US); Eric David Schank, Austin, TX (US); Brian Mead Tyler, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 1618 days.

(21) Appl. No.: 11/092,281

(22) Filed: Mar. 29, 2005

(65) Prior Publication Data

US 2005/0223048 A1 Oct. 6, 2005

Related U.S. Application Data

(60) Provisional application No. 60/557,665, filed on Mar. 30, 2004.

(51) Int. Cl.
*G06F 9/44* (2006.01)
*G06F 11/00* (2006.01)

(52) U.S. Cl. ............... 717/130; 717/127; 717/128; 714/37; 714/45

(58) Field of Classification Search ......... 717/124–135; 714/37, 38, 45
See application file for complete search history.

(56) References Cited

U.S. PATENT DOCUMENTS

| | | | |
|---|---|---|---|
| 6,145,121 A | 11/2000 | Levy et al. | |
| 6,253,368 B1 | 6/2001 | Nelin et al. | |
| 6,792,612 B1* | 9/2004 | Baentsch et al. | 719/331 |
| 7,058,928 B2 | 6/2006 | Wygodny et al. | |
| 7,100,152 B1 | 8/2006 | Birum et al. | |
| 7,367,025 B1 | 4/2008 | Nikolov et al. | |
| 7,401,141 B2* | 7/2008 | Carusi et al. | 709/224 |
| 2002/0065968 A1 | 5/2002 | Bryant et al. | |
| 2003/0070006 A1* | 4/2003 | Nadler et al. | 709/330 |
| 2003/0088854 A1* | 5/2003 | Wygodny et al. | 717/130 |
| 2003/0237078 A1 | 12/2003 | Williams et al. | |
| 2004/0068560 A1* | 4/2004 | Oulu et al. | 709/224 |
| 2004/0158819 A1 | 8/2004 | Cuomo et al. | |
| 2005/0039171 A1 | 2/2005 | Avakian et al. | |
| 2005/0091645 A1 | 4/2005 | Chilimbi et al. | |
| 2005/0132337 A1* | 6/2005 | Wedel et al. | 717/128 |
| 2005/0138113 A1 | 6/2005 | Brendle et al. | |

OTHER PUBLICATIONS

Mark W. Johnson, "The Application Response Measurement (ARM) API, Version 2", Oct. 2003. URL: http://web.archive.org/web/20031025025741/regions.cmg.org/regions/cmgarmw/marcarm.pdf.*

Sun (Creating Web Service Clients with JAX-RPC, Internet article dated 2003, URL: http://web.archive.org/web/20030404134759/http://java.sun.com/j2ee/1.3/docs/tutorial/doc/JAXRPC4.html, retrieved Jun. 14, 2010).*

(Continued)

*Primary Examiner*—Lewis A Bullock, Jr.
*Assistant Examiner*—Hang Pan
(74) *Attorney, Agent, or Firm*—Advantedge Law Group

(57) ABSTRACT

The disclosure is directed to a method of tracing processing of software instructions associated with a transaction. The method includes writing an access data stream addressed to a receiving application on a remote application server and writing a transaction identifier to the end of the access data stream. The receiving application is configured to read the access data stream and the transaction identifier when an instrumented version of the receiving application is implemented on the remote application server.

18 Claims, 13 Drawing Sheets

OTHER PUBLICATIONS

Non-Final Office Action Received in Related U.S. Appl. No. 11/092,280; Jan. 21, 2009.
Final Office Action Received in Related U.S. Appl. No. 11/092,428; Nov. 7, 2008.
Non-Final Office Action Received in Related U.S. Appl. No. 11/092,282; Nov. 26, 2008.
Final Office Action Received in Related U.S. Appl. No. 11/092,388; Nov. 10, 2008.
Final Office Action Received in Related U.S. Appl. No. 11/092,401; Oct. 30, 2008.
Arnold, Matthew, "A Framework for Reducing the Cost of Instrumented Code," T.J. Watson Research Center.
Final Office Action Received in Related U.S. Appl. No. 11/092,280; Jul. 22, 2008.
Non-Final Office Action Received in Related U.S. Appl. No. 11/092,280; Jan. 9, 2008.
Non-Final Office Action Received in Related U.S. Appl. No. 11/092,428; May 27, 2008.
Non-Final Office Action Received in Related U.S. Appl. No. 11/092,388; May 14, 2008.
Non-Final Office Action Received in Related U.S. Appl. No. 11/092,401; May 21, 2008.
Final Office Action Received in Related U.S. Appl. No. 11/092,282; Sep. 30, 2009.

* cited by examiner

```
Uninstrumented                          ─602 public void hello()
{
    System.out.println("Hello");        ─604
}
```

FIG. 6

```
                                        ─702
Instrumented public void hello()
{
    if tracing active anywhere in the JVM      ─710
        and if tracing this method
    {
        log method entry
        try                                     ─712
        {
            System.out.println("Hello");
            log method exit                     ─714
            return;
        }
        catch (Throwable t)
        {                                       ─716
            log unhandled exception
            log method exit
            throw t;
        }
    }                                           ─712
    System.out.println("Hello");
}
```

FIG. 7

```
if tracing active anywhere in the JVM)                          ┌─902
{
    if tracing this method ("classname", "methodname", "classname.methodname",
        object type, type of resource interactions contained within, current object reference) )
    {
        ...                                              ─904
    }
}
```

Uninstrumented

```
public void callDb()
{
    PreparedStatement s = ...        ⟵1302
    boolean b = s.execute();         ⟵1304
}
```

FIG. 13

Instrumented

```
public void callDb()
{
    basic entry instrumentation ⟵1406
                                    ⟵1408                        ⟵1402
    PreparedStatement s = ... ⟵1410
    boolean b = StatementProxy_execute(s);
    basic exit instrumentation ⟵1420
}
private static boolean StatementProxy_execute(PreparedStatement s)
{
    log pre resource interaction  ⟵1412
                                   ⟵1414                         ⟵1404
    boolean b = s.execute(); ⟵1416
    log post resource interaction
    return b; ⟵1418
}
```

FIG. 14

Calling Side

```
public void callRemoteObject()    ┌─1602
{
   RemoteObject r = ...           ┌─1604
   int balance = r.getBalance(...);
}
```

Called Side

```
public Class RemoteObject()
{
   public int getBalance(...)     ┌─1608
   {
      ...
   }
}
```

Calling Side

```
public void callRemoteObject()    1706   1708
{
    basic entry instrumentation                           1710        1702
    RemoteObject r = ...
    int balance = RemoteObjectProxy_getBalance(r, ...);
    basic exit instrumentation
}                                         1712 private static int RemoteObjectProxy_getBalance(RemoteObject r, ...)
{
    int balance = r.RemoteObjectProxy_getBalance(..., transaction id); 1714    1704
    if error accessing our proxy method in remote object then call the original method
    {                                                          1716
        balance = r.getBalance();      1718
    }
    return balance;
}                        1720
```

FIG. 17A

Called Side

```
public Class RemoteObject()
{                                  1722
    public int getBalance()
    {
        basic entry instrumentation   1724
        ...
        basic exit instrumentation
    } public int RemoteObjectProxy_getBalance(..., transaction id)  1726
    {
        set transaction id passed from calling system    1728
        int balance = getBalance(...);
        reset transaction id to original value     1730
        return balance;
    }                         1732
}
```

FIG. 17B

Calling Side

```
public void callRemoteObjectImplementation()
{
    OutputCommunicationStream.write (original method arguments);
}
```
⟶ 1802

FIG. 18A

Called Side

```
public void receiveRemoteObjectCallImplementation()
{
    InputCommunicationStream.read(original method arguments);
}
```
⟶ 1804

FIG. 18B

Calling Side

```
public void callRemoteObjectImplementation()
{
    OutputCommunicationStream.write (original method arguments);
    OutputCommunicationStream.write (transaction id);
}
```
⟶ 1902
⟶ 1904

FIG. 19A

Called Side

```
public void receiveRemoteObjectCallImplementation()
{
    InputCommunicationStream.read(original method arguments);
    InputCommunicationStream.read(transaction id);
    set transaction id passed from calling system
    ...
    reset transaction id to original value
}
```
⟶ 1906
⟶ 1908
⟶ 1910

FIG. 19B

Calling Side

```
public void callRemoteObjectImplementation()          ┌─2002
{
    OutputCallContext.writeHeader(original headers);  ┌─2004
    OutputCallContext.writeHeader(transaction id);
}
```

FIG. 20A

Called Side

```
public void receiveRemoteObjectCallImplementation()
{                                                     ┌─2006
    InputCallContext.readHeader(original headers);    ┌─2008
    InputCallContext.readHeader(transaction id);
    set transaction id passed from calling system
    ...                                               ┌─2010
    reset transaction id to original value
}
```

FIG. 20B

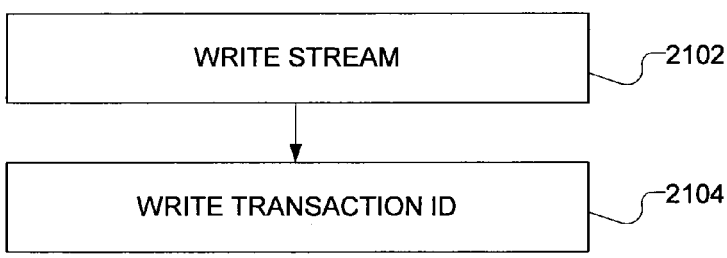

FIG. 21A

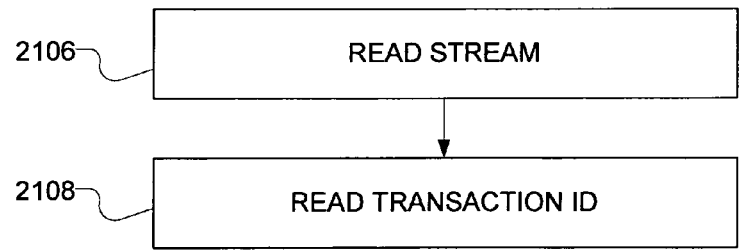

FIG. 21B

SYSTEM AND METHODS FOR CROSS-TIER TRANSACTION TRACING

CROSS-REFERENCE TO RELATED APPLICATION(S)

The present application claims priority from U.S. provisional patent application No. 60/557,665, filed Mar. 30, 2004, entitled "APPLICATION INSTRUMENTATION AND DIAGNOSTICS," naming inventor Steven Smith and which application is incorporated by reference herein in its entirety.

FIELD OF THE DISCLOSURE

The present disclosure relates generally to systems and methods for cross-tier transaction tracing.

BACKGROUND

Many industries are increasingly turning to the use of application servers to facilitate processing of transactions. With the increased use of web-based interaction, application servers are used to facilitate interaction with legacy information systems, to access databases, and to provide content for web pages. Application servers may also be used to provide cross-tier communications for accessing remote resources and for distributing computing resource usage.

As large production environments and enterprise environments use application servers having many applications and having access to external resources, there is an increasing need for software tools to trace transaction performance. Excessive use of computing resources can cause slow performance of computing systems. Broken links between applications or between applications and external resources can cause errors to propagate within systems. In addition, poorly written applications can consume excessive amounts of computing resources. Large organizations having complex enterprise environments with many different applications make tracing and system diagnosis difficult.

Some systems have been developed for tracing and evaluating applications during testing environments. However, typical systems used in testing environments execute slowly and utilize a large amount of computing resources. In addition, such testing systems tend to be less robust than systems designed for production use. As such, these systems often perform poorly in enterprise production environments.

Accordingly, improved tools for transaction tracing and application diagnosis in enterprise production environments would be desirable.

SUMMARY

In a particular embodiment, the disclosure is directed to a method of tracing processing of software instructions associated with a transaction. The method includes writing an access data stream addressed to a receiving application on a remote application server and writing a transaction identifier to the end of the access data stream. The receiving application is configured to read the access data stream and the transaction identifier when an instrumented version of the receiving application is implemented on the remote application server.

In another embodiment, the disclosure is directed to a method of tracing processing of software instructions associated with a transaction. The method includes reading a data stream provided by a remote application located on a remote application server, determining whether the data stream includes a transaction identifier appended to the data stream, and setting a transaction identification of a process to the transaction identifier when the data stream includes the transaction identifier.

In a further embodiment, the disclosure is directed to a method of adding instrumentation instructions to provide for tracing capability of a computer executable application. The method includes receiving an application file prior to loading the application file onto an application server. The application file includes a first routine including a set of data stream writing instructions configured to provide a data stream configured to access a remote application located on a remote server. The method further includes processing the application file to add instrumentation instructions and to create an instrumented file. The instrumented file includes a second routine including the set of data stream writing instructions and a set of transaction identification writing instructions. The transaction identification writing instructions are configured to add a transaction identification to the data stream. The method also includes loading the instrumented file onto the application server.

BRIEF DESCRIPTION OF THE DRAWINGS

FIGS. 6 and 7 are illustrations depicting exemplary embodiments of uninstrumented and instrumented methods, respectively.

FIGS. 13 and 14 are illustrations depict exemplary embodiments of uninstrumented and instrumented applications, respectively.

FIG. 15 is a block diagram depicting an exemplary enterprise environment.

FIGS. 16A, 16B, 17A, 17B, 18A, 18B, 19A, 19B, 20A and 20B are illustrations depicting exemplary embodiments of applications and application methods.

FIGS. 21A and 21B are flow diagrams depicting exemplary methods for tracing transactions.

DESCRIPTION OF THE DRAWING(S)

In a particular embodiment, the disclosure is directed to enterprise environments, methods for tracing transactions within such enterprise environments and applications running in application server environments on servers located within such enterprise environments. Instrumented applications and the methods implemented by instrumented applications log performance characteristics associated with the processing of a transaction. In addition, the disclosure is directed to methods for instrumenting applications such that the applications include tracing instructions.

Figure 1:
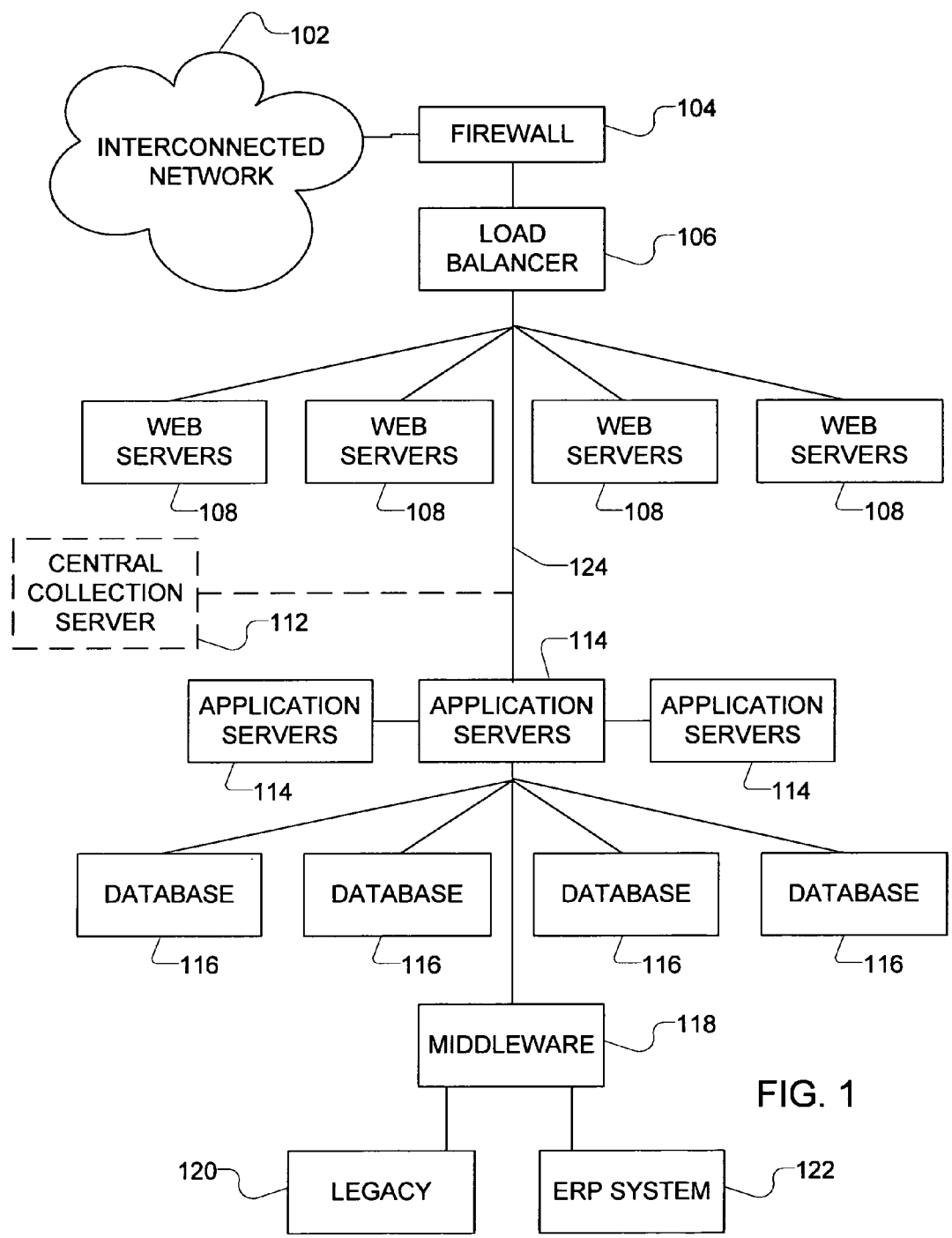
FIG. 1 is a diagram of an exemplary enterprise system.

FIG. 1 is a block diagram depicting an exemplary computing environment, such as a large-scale production environment or an enterprise network environment. The computing network includes one or more application servers 114. The computing network may also include a firewall 104, a load balancer 106, one or more web servers 108, one or more databases 116, middleware systems 118, legacy systems 120 and ERP systems 122. In addition, the computing environment may include a central collections server 112. Each of these elements may be communicatively coupled to a network 124.

A user or remote computing system may access the computing environment through an interconnected network 102, such as a global interconnected network, wide area network, or the Internet. Transaction requests may be processed through firewall 104 and load balancer 106. In a particular example of a web-based interaction, the load balancer 106 may direct a request to one of the set of web servers 108.

The web servers 108 may, for example, serve web pages containing data and results from one or more transactions, such as process requests to application servers 114 and queries to databases 116, legacy systems 120 and ERP systems 122. The web servers 108 may include application server environments. In addition, the web servers 108 may access other application servers 114 having application server environments. Applications within the application server environments of the web servers 108 and the application servers 114 may function to perform calculations and access databases 116, the middleware 118, the legacy system 120 and the ERP systems 122. In addition, individual applications may access other applications within the application server environment or within other application server environments located on other application servers.

Instrumented applications within these application server environments may trace transactions or log performance characteristics associated with the performance and execution of transaction requests. These logs of performance characteristics may be stored locally and periodically collected by the central collection server 112. The central collection server 112 may function to interpret log data from the web servers 108 and application servers 114. The central collection server 112 may also function to provide an interface to data associated with transaction performance and an interface to activate tracing and supply filters.

Figure 2:
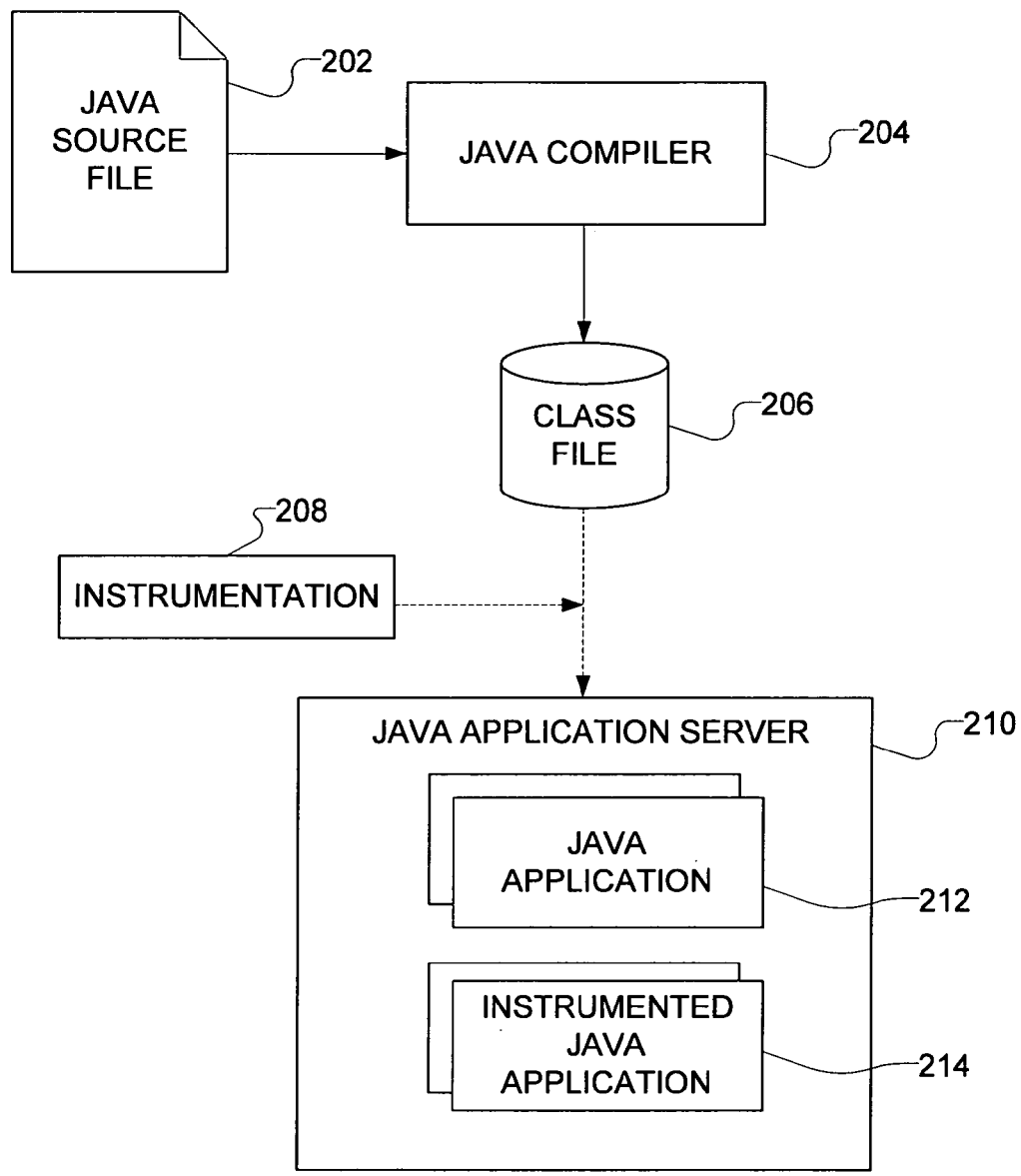
FIGS. 2, 3 and 4 are flow diagrams illustrating methods for instrumenting a computer-implemented application.

FIG. 2 depicts an exemplary method for instrumenting an application. In this particular example, the method depicts instrumenting a JAVA application. However, instrumentation may be implemented for other applications developed in other languages, such as Microsoft's .NET® Framework including C# and Visual Basic .NET.

As depicted for a JAVA based system, a JAVA source file 202 is compiled by JAVA compiler 204 into class file 206. Typically a JAVA application server loads and processes the class file 206 to form JAVA application 212. To instrument an application, an instrumentation program is executed to manipulate the class file 206 prior to loading by the application server 210, adding instrumentation instructions 208 during preprocessing of the class file bytes. In one exemplary embodiment, the instrumenting program is called as an extension of the application level class loader to preprocess the class file 206 before a defined class call is made. In an exemplary application server environment, such as WebLogic®, the extension may be specified by weblogic.classloader.preprocesser and implements weblogic.utilis.classloaders.classpreprocesser. In another exemplary application server environment, such as Web Sphere®, the extension may be specified by com.ibm.websphere.classloader.plugin and implements com.ibm.websphere.classloader-.classloaderplugin. Once the instrumented class file bytes are loaded, the application server 210 includes an instrumented application 214.

In a .NET® Framework, an assembly is processed to permit execution in a Common Language Runtime (CLR) environment. Typically, at distinct points during the processing of the assembly, access is provided for (i) adding a class, (ii) modifying a class, (iii) adding a method within a class, or (iv) modifying a method within a class. In one particular embodiment, instrumentation, such as proxy classes and methods, may be added during the processing of an assembly by adding a class or method during the distinct point in the processing in which a class or method may be added. The newly added class or method is provided with a pointer that points to memory space occupied by an existing class or method. At a point in the process in which methods may be modified, the newly added methods are modified to point to a memory space including new instructions that provide the method with the desired functionality.

In another embodiment, existing methods may be modified. For example, an instrumentation program may processes a memory space associated with a particular method, formulate an object structure from the instructions and data within the memory space, and generate an instrumented version of the instructions and data. The particular method is provided a pointer to the instrumented version of the particular method.

Figure 3:
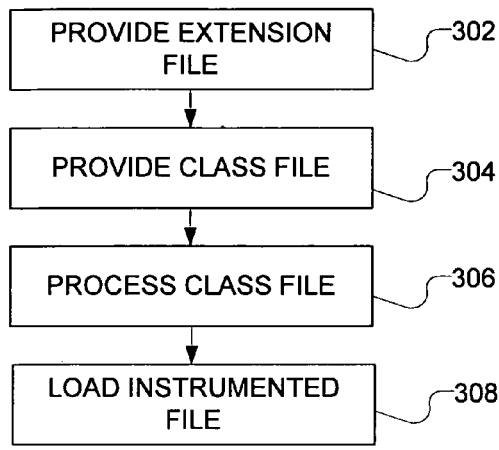

FIG. 3 is a flow diagram depicting an exemplary method of instrumenting software applications to provide tracing capabilities. A program is provided to the application server environment, as illustrated step 302. The program provides methods for interpreting class files and for implementation within those class files, such as through preprocessing of the class file. A class file is provided to the application server environment, as illustrated at step 304. Prior to loading, the application server preprocesses the class file bytes using the program to produce an instrumented file, as illustrated at step 306. The instrumented file is loaded as an instrumented application, as illustrated at step 308.

Figure 4:
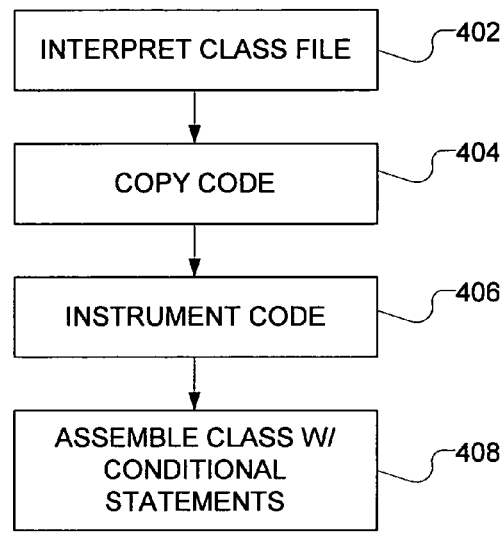

The class file may be processed to add conditional logic, tracing and logging instructions, exception handling instructions, and subroutines. In one exemplary embodiment, methods within the class file are processed to provide an instrumented version of the methods coding or program segments and a non-instrumented version of the methods coding or program segment. Conditional logic is added to determine which version or program segment should be executed. FIG. 4 is a flow diagram depicting an exemplary method for instrumenting an application. The class file is interpreted, as illustrated at step 402. Instruction lines or coding within a method are copied, as illustrated at step 404. One version of the coding or instruction sets is instrumented, as illustrated at step 406. The code is assembled to include the instrumented program segment, a non-instrumented program segment, and conditional logic to determine which program segment is to be executed upon the receipt of the request, as illustrated at step 408.

Referencing FIG. 2, the application server environment 210 may include a global variable, Boolean variable, or flag to indicate whether tracing or performance logging has been activated for the environment. The instrumented application 214 may include conditional logic to determine whether tracing is dormant or active within the application server environment 210, such as through access of the global variable, and whether tracing is active or dormant for specific applications and methods implemented in the applications. When tracing is active, the instrumented application 214 may log performance characteristics data, such as task durations and errors, in a local memory log, such as a thread local memory. The performance characteristic log may be periodically transmitted or collected by a central collection server and interpreted to ascertain performance characteristics of transactions.

In one particular embodiment, tracing may be dynamically activated and deactivated during run time, for example, without restarting the server. In one embodiment, a user may activate tracing by providing a filter that specifies which applications are to be traced and what data is to be collected. The filter may, for example, be provided through a graphical user interface, programmatically, or through a header associated with a transaction request, such as an HTTP header. In one exemplary embodiment, the central collection server may provide an interface for specifying a filter. In a particular example, the filter specifies particular methods to be traced, criteria specifying which data is reported, and parameters describing how that data is to be reported.

The criteria may, for example, include minimum speeds and maximum depths. For example, data is collected for transactions having execution times greater than the minimum speed and data is not reported for transactions having execution times lower than the minimum speed. For applications that result in calls to other applications, data may not be reported for applications having call depth greater than the maximum depth. For example, if a first application calls a second application, which calls a third application and so on, the maximum depth may be set to prevent collection or reporting of data for calls to applications beyond the second or third application.

In addition, the filter may specify how the data is to be reported, such as detailed or aggregated. In one particular example, the filter may specify that the data should be aggregated. In large enterprise environments, tracing a single application may result in a large amount of data. The large amount of data may tax system resources. Aggregation reduces the amount of data collected, while providing meaningful tracing, by providing statistical data instead of detail data. In one example, the aggregate parameters may specify aggregation of data for each application in a series of calls. For example, an application A may call an application B that calls an application C. The system may provide aggregated statistical data for each of A, B, and C. In another example, the aggregate parameters may specify transaction level aggregation. When an application calls a second application more than once, the system may provide statistical data aggregated over the calls to the second application. In a further example, the aggregation parameters may specify filter level aggregation in which the system provides aggregated statistical data for the overall performance of applications specified by the filter. In addition, data may be aggregated at the method level within an application. For example, aggregated data may report data associated with the average performance over a plurality of method executions of a particular method.

Figure 5:
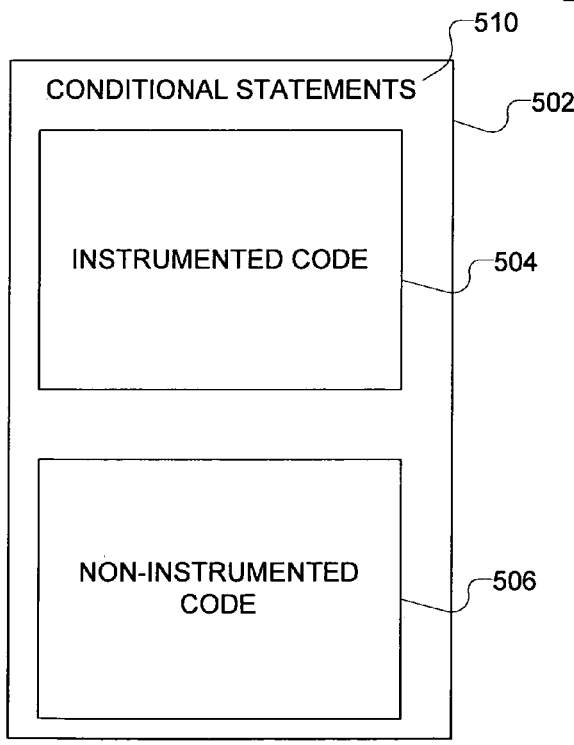
FIG. 5 is a block diagram depicting an instrumented application.

FIG. 5 depicts an exemplary method 502 within an instrumented application. The method includes conditional statements 510 that direct the execution of the instrumented code 504 or non-instrumented code 506, based on whether tracing of the application is active or dormant. For example, the conditional statements 510 may determine whether tracing is dormant or active anywhere within the application server environment. For example, the conditional statements may test a value of a Boolean variable or flag used to indicate whether tracing is active within the server environment. In another exemplary embodiment, the conditional statements 510 may test to determine whether tracing is active for a specific application, class, or method. For example, the conditional statements 510 may test to determine whether the application class or the specific method within the class are found in a list of classes or methods to be traced. In one particular embodiment, a static constant may be included with the class that indicates the name of the class, the method or both. This static constant may be evaluated to determine whether the constant is found within the list.

When tracing is active, the instrumented code 504 may be executed. When tracing is dormant or inactive, the non-instrumented code 506 may be executed.

In one particular embodiment, a high degree of fault tolerance is provided by reducing the possibility of instrumentation code inducing an application failure when tracing is not active. In another embodiment, overhead is reduced when tracing is not active because a non-instrumented version of the code is executed. Additional checks to log resource interactions or method entry and exit events are avoided. In this particular embodiment, when tracing is dormant or inactive a simple Boolean check is performed in each method in addition to the normal method code. In practice, the Boolean check operation adds between 0 and 15 microseconds of execution overhead per 10,000 method invocations. For example, the Boolean operation to determine whether tracing is inactive, such as globally in an application environment or in a particular application, adds not more than 10 microseconds of execution overhead per 10,000 method invocations.

FIGS. 6 and 7 depict uninstrumented and instrumented versions of a method, respectively. The pseudo-code depicted in these and similar figures is presented to illustrate the logic flow of the byte logic of applications. FIG. 6 depicts a simple method including a method name 602 and a set of the original method instructions 604. FIG. 7 depicts an instrumented method. The instrumented method includes a method name 702, conditional logic 704, instrumented code 706, and non-instrumented code 708. The instrumented code 706 includes exception handling instructions 716, original method instructions 712, and logging instructions, such as method entry logging instruction 710. The non-instrumented code 708 includes original method instructions 712.

When executed the conditional logic 704 evaluates whether tracing is active or dormant within the application server environment, such as the JAVA VIRTUAL MACHINE (JVM) in a JAVA based system or .NET Common Language Runtime (CLR). The conditional logic 704 may also determine whether tracing is active for the particular method. If tracing is inactive or dormant within the JVM or CLR or tracing is inactive or dormant for the particular method, the non-instrumented code 708 is executed. When tracing is active within the JVM or CLR and tracing is active for the particular method, the instrumented code 706 is executed.

In the particular embodiment, the instrumented code 706 includes a log of the method entry 710 and an attempt to execute the method instructions 712. When the method instructions execute without exception or error, the method exit is logged at instruction 714. When an exception is detected, the exception handling code 716 is executed. The exception handling code 716 may include logging the unhandled exception, logging the method exit and returning an identification of the exception or error condition.

While FIGS. 6 and 7 depict a simplified example of a method, more complicated method instruction sets, including more than one line of code, may be implemented and traced using the logic exhibited in these figures. In one particular embodiment, the logic is implemented in the byte code in a JAVA environment or intermediate language in a .NET environment, and not in the programming environment.

Figure 8:
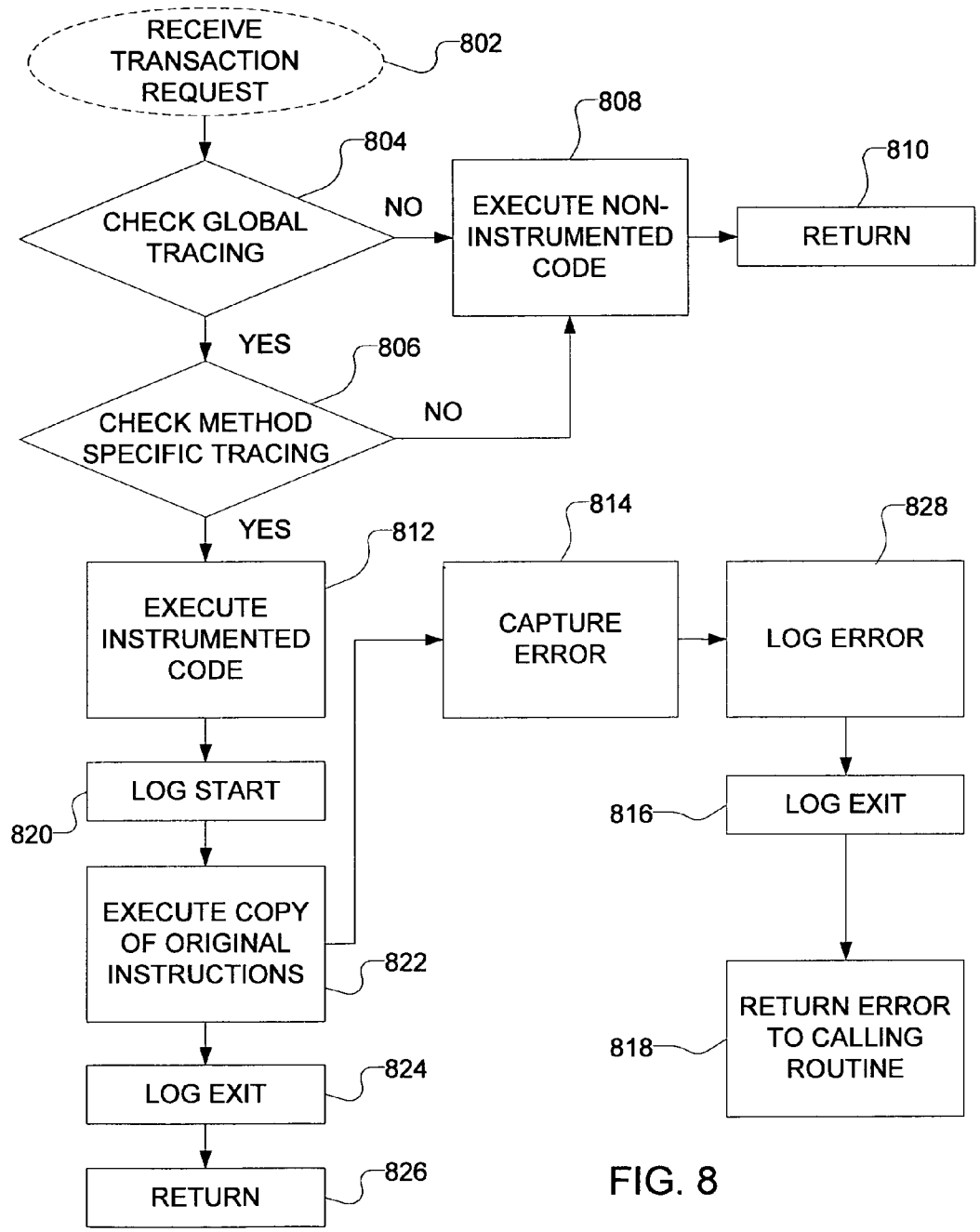
FIG. 8 is a flow diagram illustrating a method of tracing a transaction.

FIG. 8 is a flow diagram depicting an exemplary method for tracing the performance and operation of a transaction. A transaction request may be received, as illustrated at step 802. An instrumented method may include conditional logic that checks a global flag to determine whether tracing is active or inactive within the application server environment, as illustrated at step 804. When tracing is inactive or dormant, the method may execute the method steps in the form of non-instrumented code, as illustrated at step 808, and return results, as illustrated at step 810. When tracing is active, the application method may check to determine whether tracing is active or dormant for the specific method, as illustrated at step 806. If tracing is inactive or dormant for that specific method, the application method may execute the method steps in the form of non-instrumented code, as illustrated at step 808, and return results, as illustrated at step 810.

When tracing is active for the specific method, the application method may direct the execution of instrumented code, as illustrated at step 812. The instrumented code may include logging the start of the execution, as illustrated at step 820, and executing the method steps, such as method steps in the form of a copy of the original instructions, as illustrated at step 822. The application logic may include logging the exit, as illustrated at step 824, and returning, as illustrated at step 826. In the event of an error, the system may capture the error as illustrated at step 814, log the error 828, log the exit of the method, as illustrated at step 816, and return the error to the calling routine, as illustrated at step 818.

Figures 9, 10:
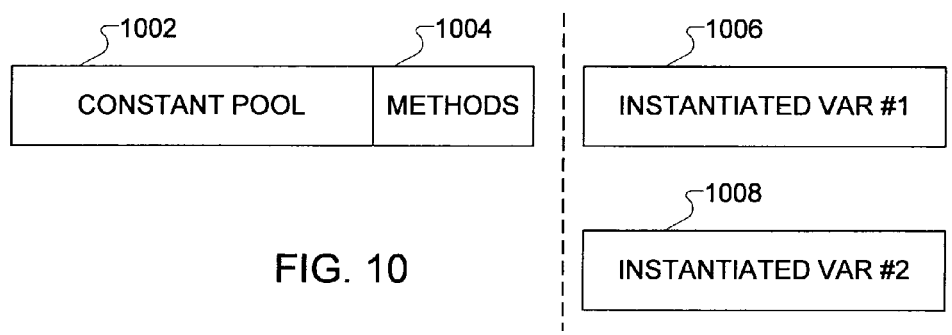
FIG. 9 is a pictorial illustrating an exemplary conditional logic.
FIG. 10 is a pictorial illustrating an exemplary instrumented application.

FIG. 9 illustrates an exemplary embodiment of conditional logic. In this particular embodiment, two conditional tests may be made sequentially. The first test may determine whether tracing is active or dormant within the application server environment, such as a JAVA VIRTUAL MACHINE (JVM) or .NET Common Language Runtime (CLR). The test 902 may evaluate a Boolean variable, such as a global Boolean variable indicating whether testing is active within the JVM or CLR. When tracing is inactive or dormant within the JVM or CLR, the traced or instrumented program segments may be skipped, executing only the non-instrumented program segments. A second conditional test 904 may be used to evaluate whether tracing is active or inactive for the specific method. In this particular example, arguments are passed to a checking routine that evaluates the class name, method name and combined class name and method name to determine whether the class and method are to be traced. As illustrated in the example, the arguments may be statically determined at instrumentation time as opposed to being dynamically determined at runtime. The class name, method name and combined class name and method name, may be stored as static constants within the class for use in this invocation of the checking routine. For example, the class name, method name or class and method name combination may be tested against a list or lists of names to determine whether tracing is active or dormant for the class and method. The function call may further utilize arguments including object type, the type of resource interactions contained within the method and the current object reference. When tracing is inactive or dormant for the specific method, the un-instrumented program segment is executed and the instrumented program segment is not executed.

When objects are instantiated from the classes in application server environments, such as JAVA-based or .NET environments, they share a constant pool (known as meta data tokens in .NET) and access to a common or shared library of methods. FIG. 10 is a block diagram illustrating instantiated applications. The constant pool 1002 and methods 1004 are shared and, thus memory requirements for the constant pool 1002 and the methods 1004 do not increase as the number of instances of the application increases. On the other hand, for each instance of the applications, a set of variables is instantiated, such as instantiated variable sets 1006 and 1008 for two instances of the application. Instrumentation of the methods increases the size of the method block 1004. However, that increase has limited impact on the memory requirements of the system since the method block 1004 is shared. If a static constant is used to identify a class or method, a static constant is added to the constant pool 1002, increasing the size of the static constant pool 1002. However, since the static constant pool is shared, the increased size of the static constant pool 1002 has little impact on the memory requirements.

Figure 11:
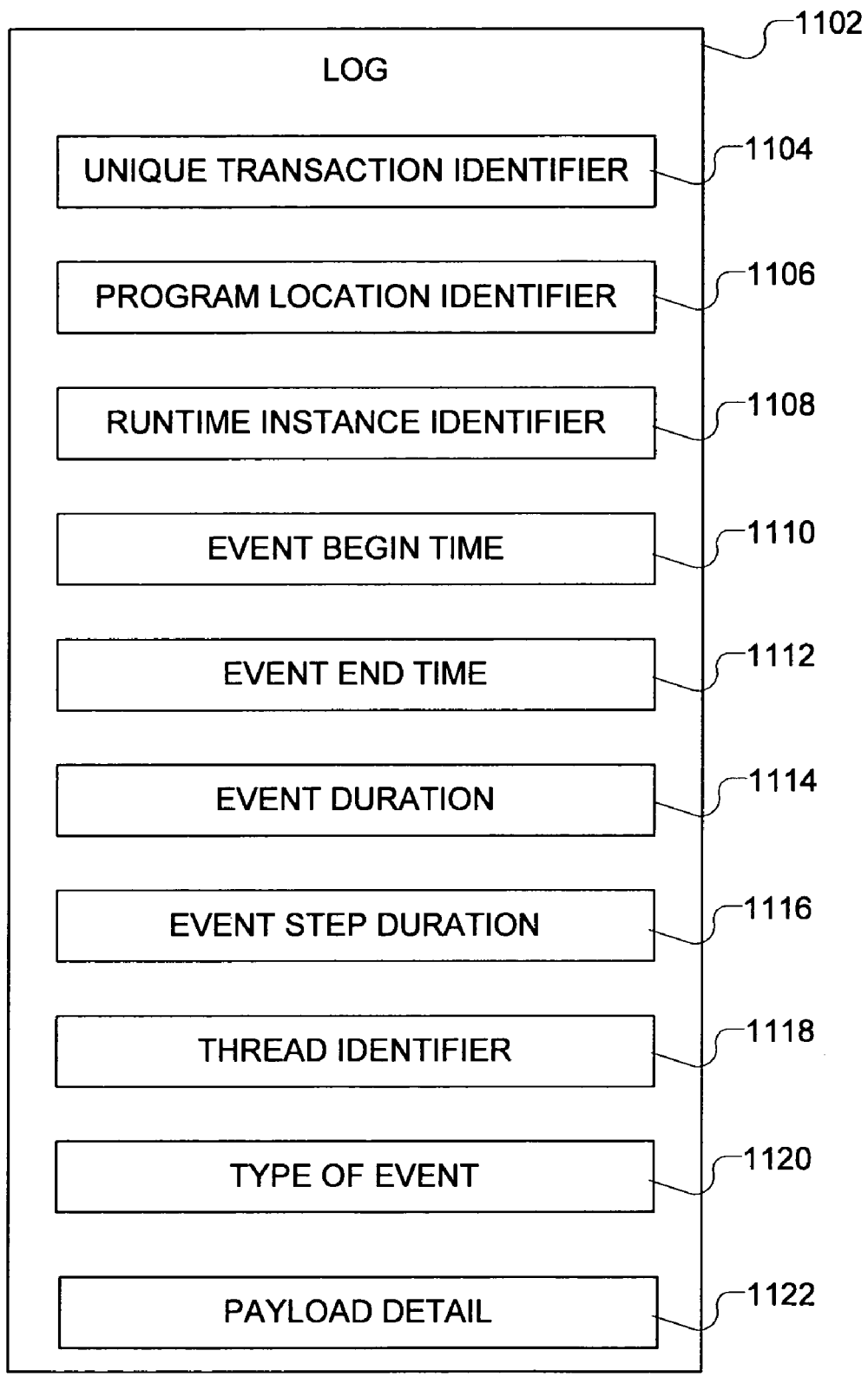
FIG. 11 is a block diagram depicting an exemplary data log.

In exemplary application server environments, each instance of an object or application is executed within a thread. Each thread is provided with a thread local memory. In one particular embodiment, a log of the performance and operation of the methods associated with an application is stored within the thread local memory. FIG. 11 is a block diagram depicting an exemplary log 1102. The log 1102 may include a unique transaction identifier 1104, a program location identifier 1106, a run time instance identifier 1108, an event begin time 1110, an event end time 1112, an event duration 1114, a thread identifier 1118, the type of event 1120, and optional payload detail 1122. The unique transaction identifier 1104 may be used to identify the transaction with which the method performance is associated. The program location identifier 1106 may be used to identify the package name, class name, and method name, for example, in a JAVA program. For a .NET application, the program location identifier 1106 may include an assembly name. The run time instance identifier 1108 may be used to identify the instance of a particular application used to perform the method, such as the particular JAVA object or .NET object. The event begin time 1110, event end time 1112, event duration 1114, and event step duration 1116 may be used to identify and evaluate the performance of a particular method. For example, the event step duration 1116 may indicate how long an event took exclusive of the time taken by a sub event, other child method invocations, or resource interactions. The thread identifier 1118 may identify the particular thread within which the method was performed and the type of event 1120 may be used to identify the particular type of event (method, web, ejb, sql, jca, jms). The type of event is an indicator as to what type of timing or interaction the event pertains. In one embodiment, method events are general timing events related to a method. Web events are timing events related to a web component (JSP, Servlet, ASP.NET etc.). Ejb events are timing events related to an Ejb component (session bean, entity bean, etc.) (ServicedCompents in .NET). The remainder are resource interaction events. For example, SQL events may be timing events related to a database interaction. JCA may be timing events related to a legacy system or packaged application (ERP, CRM) interaction. JMS events may be timing events related to a messaging system interaction (middleware).

Optional payload details 1122 may include additional data associated with the type of event 1120. For example, "payload" details associated with a SQL method call may include: a URL (location of the database being queried or updated); a user name (database name used for this query); a database product (type of database being queried); a database version (version of database being queried); a driver name (name of database driver (database access software) used in this query); and driver version (version of database driver used). Other payload details may include thread ID, exception, exception type, remote user, request URL, query string, session ID, session creation time, SQL statement, message ID, priority, message type, correlation ID, delivery mode, destination, destination type, reply-to, reply-to type, reply-to path, record name, record description, record hashcode, record class, record type, record count, resource warning error code, resource warning stack trace, name, method count, servlet method count, exception method count, SQL method count, JCA method count, JMS method count, EJB method count, memory count, JNDI method count, WebService method count, soap action, SQL command type, connection string, database, data provider type, data source, server version, SQL/Server workstation ID, OLE/DB provider, ODBC driver, timestamp, size, PInvoke method, PInvoke module, queue, queue path, queue ID, queue label, label, destination path, transaction ID, filter, search root, search scope, and SQL parameters. Alternatively, payload details 1122 may include aggregated statistical data associated with performance of multiple instances particular application, particular transaction chains of applications, or particular filters.

Figure 12:
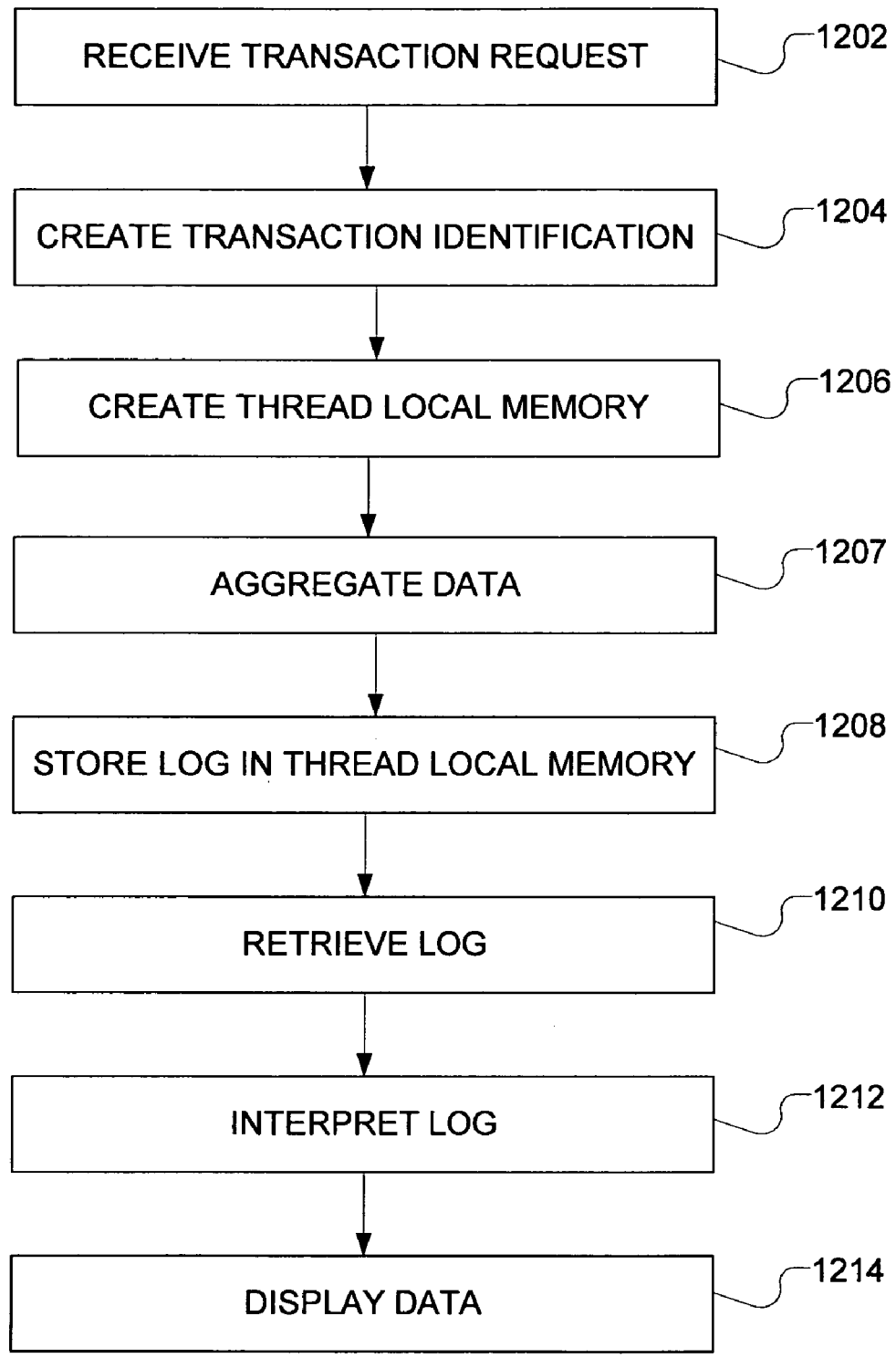
FIG. 12 is a flow diagram illustrating a method of tracing a transaction and processing data resulting therefrom.

FIG. 12 depicts an exemplary method for collecting and interpreting log data. A transaction request is received, as illustrated at step 1202. A transaction identification is created as illustrated at step 1204. Thread local memory is created, as illustrated at step 1206. Depending on the filter, data may be aggregated after the thread local memory is created and as the data is collected, as illustrated at 1207 or data may be stored and aggregated prior to transferring the log. As an instrumented application or method is executed, a log is stored in the thread local memory, as illustrated at step 1208. The log may, for example, include identifiers, such as transaction identifiers, program location identifiers, run time instance identifiers and thread identifiers, and performance characteristics, such as event duration and event step duration.

A transaction may result in multiple logs associated with several invoked methods across several servers. A central collection server may periodically retrieve logs, as illustrated at step 1210, and interpret the logs, as illustrated at step 1212. The interpretation of the logs may function to associate log data with a particular transaction or filter, determine where inefficiencies or exceptions occurred within a transaction and evaluate the performance of a given transaction. Data derived from the logs and summarized performance data may be displayed by the central server or collection system, as illustrated at step 1214.

Oftentimes, applications and application methods are used to access external resources, such as legacy systems and databases. FIGS. 13 and 14 depict un-instrumented and instrumented code, respectively. In the exemplary un-instrumented code depicted in FIG. 13 a prepared statement is assigned at line 1302, followed by execution of that statement at line 1304. In the instrumented version depicted in FIG. 14, a private proxy method 1404 implements the execution of the statement. An instrumented program segment 1402 has an equivalent method name as that of the un-instrumented code. The instrumented code 1402 includes the basic instrumentation 1406 and 1420 surrounding the prepared statement assignment 1408. In place of the execution statement, a function call to a proxy method is made at 1410. The proxy method 1404 includes additional instrumentation, such as logging instrumentation 1412 and 1416 for the resource interaction. In addition, the proxy method includes the execution of the prepared statement 1414. The proxy method returns the output from the execution command 1414 at line 1418. In one particular embodiment, the implementation of the proxy method may be preferable to adding code inline since the stack setup sequences are handled automatically. The insertion of a proxy method at instrumentation time permits instrumentation of a class file while maintaining the order of the stack sequence. In addition, the proxy statement 1404 allows for the logging of resource interactions and exception handling. In another embodiment, the instrumented method 1402 may include non-instrumented code that includes assignment 1408 and execution statement 1414 for execution when tracing is inactive or dormant. In a further embodiment, the proxy code 1404 may include a non-instrumented version of the execution statement 1414 for execution in the event of an error or exception.

In one particular embodiment, the use of a private static proxy method results in one method being added to the method area of the JVM or CLR. As a result, little memory is used because a single method is added to the method area and is accessible to each of the instances of the class. In another embodiment, resource interactions of a similar type, such as PreparedStatement.execute, may share the same static method. As such, a single method for each type of resource interaction would be added to a given class.

In an alternative embodiment, a proxy class associated with an existing class may be added, statically or dynamically. The proxy class includes proxy methods that access associated methods in the existing class. The proxy methods are instrumented to track performance of the existing methods when accessed by instrumented code. Methods within the instrumented code access proxy methods within the proxy class, which, in turn, access the existing methods within the existing class associated with the proxy class.

Figures 15, 16A, 16B:
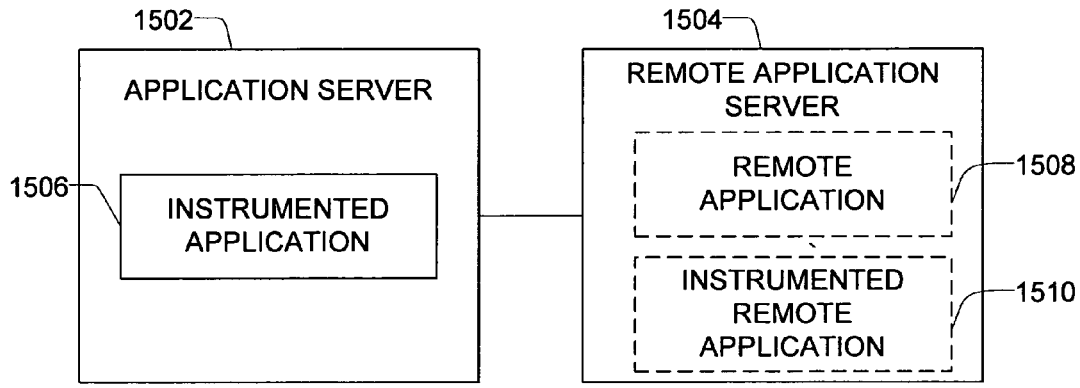

Within an enterprise environment, several application servers or tiers of application servers may be utilized. Each tier of application servers may perform specified functions for the enterprise environment as a whole. FIG. 15 depicts an exemplary enterprise environment in which an application server 1502 accesses a remote application server 1504. An instrumented application 1506 on application server 1502 may access the functionality of a remote application server 1504. The remote application server 1504 may or may not have been provided with instrumented applications. As such, the remote application server may include a remote application 1508 or an instrumented version of the remote application 1510. In a particular embodiment, the instrumented application 1506 may access the instrumented remote application 1510 or in the event of an error or exception may access the remote application 1508. In addition, the instrumented application 1506 may attempt to transfer or transmit a transaction identification and optionally a filter to the remote application server 1504.

The transaction identification may be used to associate performance data from different application servers. When a transaction includes several invocations of methods on remote systems and may further include additional invocations of methods on other systems invoked from the remote systems, a consistent identifier associated with the performance data of each invocation is used to assemble the performance data into a single view or data set associated with the transaction. The transaction identification may be transferred via a request from the invoked remote application. Alternatively, the transaction identification may be included as an argument of the remote method invocation. In another exemplary embodiment, the transaction identification may be appended to an output stream.

In addition to the transaction identification, filter data may be transferred to the remote system. The filter data may, for example, include reporting criteria, such as minimum speed or maximum depth. In one example, the minimum speed specifies when application data is report. For example, data may be reported for applications having execution times greater than the speed and applications having execution times less than the speed may be ignored. The maximum depth may, for example, specify the depth through which data is recorded. A call to a first application may result in a call to a second application, which may result in a call to a third application and so on. The maximum depth may, for example, specify that data is to be collected for the first and second application and not for deeper calls. Furthermore, the filter may include parameters specifying how data is to be collected, such as parameters for use in aggregating data.

FIGS. 16A and 16B depict exemplary uninstrumented code on both the calling side and the remote called side, respectively. The exemplary code of FIG. 16A depicts the definition of an object 1602 and a method call to that object 1604. The called side depicted in FIG. 16B includes the remote object and the method 1608.

FIGS. 17A and 17B depict the associated instrumented code for both the calling side and called side, respectively. The instrumented code examples of FIGS. 17A and 17B illustrate using the transaction identification as an argument in method invocation. The exemplary calling side depicted in FIG. 17A includes an instrumented method 1702 that includes basic instrumentation 1706 and 1712, assignment of the remote object 1708, and a call to a private static method 1710. The calling side further includes the private static method 1704 that includes a return call 1720 and a remote object call 1714 to an instrumented remote object 1726 having the transaction identification as an argument. In one particular embodiment, adding the private static method at instrumentation time may be preferable to adding the code inline since the stack sequences are handled automatically and the addition of a static method has limited impact on memory requirements.

In the event that the call fails, as indicated by logic 1716, the function may call the application method 1722, which includes instrumentation instructions 1724, without passing the transaction identification, as illustrated at line 1718. The called side application depicted in FIG. 17B may receive the transaction and associate the logged performance and diagnostic data with the transaction identification through the remote object proxy function 1726. In this exemplary embodiment, the proxy function sets the transaction identification, as illustrated at line 1728, invokes the method 1722, as illustrated at step 1730, and returns the value or result, as illustrated at line 1732. Basic instrumentation may be added to each method, both on the calling and called side, as described above. In one particular embodiment, an uninstrumented program segment of method 1702 executes a call to the remote object method with the original argument list and without the transaction identification, when tracing is inactive. In another exemplary embodiment, the private method 1704 executes a function call to the remote object method with the original argument list, avoiding error in the event that the remote application server does not have instrumented code and permitting fast access and execution when tracing is dormant or inactive.

Private static methods may be added to classes that handle invocation of remote object methods. In one embodiment, adding the static method permits the stack setup sequence to be handled automatically. Because the added method is static, a single instance of the method serves instances of this class, which mitigates the additional storage requirement associated with the new method. In addition, the added static method is provided a memory stack having the order intended in the class file byte code prior to instrumentation. Alternatively, proxy classes may be added and accessed dynamically.

On the called side, the remote object proxy method accepts or receives the transaction identification that is passed in the argument list and establishes it as the current transaction identification for the application executed on the remote server that services the remote method invocation. However, if the remote server does not include instrumented applications, calls to an instrumented application would fail. In this instance, the instrumented calling side code calls a method using the original argument list without the transaction identification. Instrumentation of the called side application maintains the method that uses the original argument list. In this manner, instrumented calling side servers may access methods on non-instrumented called side servers. In addition, non-instrumented calling side servers may access instrumented called side servers.

Using an alternative method, the transaction identification may be appended to an output stream. FIGS. 18A, 18B, 19A and 19B depict this exemplary method for tracing a transaction across servers or application server tiers. FIGS. 18A and 18B depict exemplary un-instrumented applications. The exemplary application on the calling side illustrated in FIG. 18A, writes a communication stream with set of method arguments, as illustrated at line 1802. As depicted in FIG. 18B, the receiving object reads the communication stream including the method arguments, as illustrated at line 1804. FIGS. 19A and 19B depict the calling side and called side of instrumented code, respectively. Basic instrumentation is added to each method as described above. The calling side depicted in FIG. 19A writes a communication stream with the method arguments, as illustrated at line 1902, and appends the transaction ID to the end of the communication stream, as illustrated at line 1904. As depicted in FIG. 19B, a called side reads the communication stream including the original method arguments, as illustrated at line 1906, and reads the transaction ID, as illustrated at line 1908, and sets the transaction ID, as illustrated at lines 1910. The called side application may set the transaction identification to that passed from the calling side system.

In one particular embodiment, if tracing is inactive, the transaction ID is not written to the communication stream. On the calling side, as the remote method arguments are written to the output communication stream, a copy of the current transaction ID is written when currently tracing. If the called system is not instrumented, the transaction ID is residual data and is not consumed as an additional argument by the called system. On the called side, as the past method arguments are being read from the input communication stream, an attempt to read a copy of any past transaction ID is made. When the transaction ID is not present, for example, the caller of the particular remote method was either not instrumented or not currently tracing. Exception handling may be added to accommodate for missing transaction ID in the communication stream.

FIGS. 20A and 20B depict an exemplary embodiment of cross tier method invocation that leverages the call context methods of the .NET environment. On the calling side illustrated in FIG. 20A, the original headers are written, as illustrated at line 2002. The transaction ID is appended to the original headers, as illustrated at line 2004. On the called side illustrated in FIG. 20B, the original headers are read, as illustrated in line 2006. The transaction ID is read, as illustrated at line 2008. The application sets the transaction ID to that passed from the calling side system, as illustrated at lines 2010.

FIGS. 21A and 21B exhibit exemplary methods for use by the cross tier enterprise environment. Depending on the environment, a stream or header is written as part of a communication with a remote object, as illustrated at step 2102. For example, environments may include JVM or .NET environments. The transaction ID may also be written, as illustrated at step 2104. On the called side illustrated in FIG. 21B, the communication stream or header is read, as illustrated at step 2106. If the application is instrumented, it may attempt to read the transaction ID at the end of the data stream, as illustrated at step 2108, and set the identification of the process to the transaction ID. A log associated with the process may be written to memory and may include the transaction ID. If the application is not instrumented, the application may ignore the transaction ID and may associate a unique identifier with the processing of the application. In particular embodiments, the remote application or called side application may append the transaction ID to return communication or data streams or in headers associated with the return data streams.

The disclosed systems and methods provide an application performance management product that offers a high degree of visibility into the lifecycle of applications suitable for application server environments, such as, J2EE or .NET applications. Exemplary embodiments may provide insight into transaction execution path down to the individual JAVA or .NET method level; provide insight into transactional resource interactions with databases, message queuing systems, and enterprise information systems; provide a composite view of the transaction lifecycle, even when the transaction spans multiple infrastructure tiers; provide for production environments with an on-demand product architecture; leverage advanced instrumentation techniques to add low overhead to managed applications; and avoid application source code changes or API implementations.

Exemplary embodiments may operate in a production J2EE application server environment or may operate using a Microsoft® .NET environment. Exemplary embodiments can be deployed on a production system of various sizes with limited decrease in throughput or overall server performance. Instrumentation bytecode may be added to an application class at load time prior to its submission to, for example, a JAVA VIRTUAL MACHINE (JVM) or .NET Common Language Runtime (CLR). Exemplary embodiments are consistent with NM JVM and CLR class file verification and environmental security processes. Pertinent transaction data may be collected in an in-memory queue for subsequent forwarding to a centralized collection server.

Portions of the methods described herein may be implemented in software code for carrying out the methods described. In one embodiment, the code may be contained on a data storage device, such as a hard disk, magnetic tape, floppy diskette, optical storage device, networked storage device(s), or other appropriate data processing system readable medium or storage device.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of tracing processing of software instructions associated with a transaction, the method comprising:
   receiving an application file prior to loading the application file onto an application server, the application file comprising a first routine comprising a set of data stream writing instructions configured to provide a data stream configured to access a remote application located on a remote server;
   processing the application file to add instrumentation instructions and to create an instrumentation file, the instrumented file comprising a second routine and a private static method, wherein:
      the second routine is programmed to invoke the private static method and includes a set of transaction identification writing instructions, the transaction identification writing instructions being configured to add a transaction identifier to the data stream;
      the private static method comprises the set of data stream writing instructions and enables a stack setup sequence to be handled automatically;
   associating a transaction identifier with performance data of the application file on a first application server;
   invoking a method of the remote application on the remote application server;
   providing the transaction identifier to the remote application;
   associating the transaction identifier with performance data of the remote application on the remote application server;
   filtering the performance data of the remote application and the performance data of the application file based on a maximum call depth requirement such that performance data associated with a method called after the maximum call depth requirement is surpassed is ignored.

2. The method of claim 1, wherein the transaction identifier is included as an argument for invoking the remote method of the remote application.

3. The method of claim 1, wherein the transaction identifier is appended to an output stream sent from the application file to the remote application.

4. The method of claim 1, further comprising:
   filtering the performance data of the application file and the performance data of the remote application based on a minimum speed requirement such that performance data indicating execution times less than the minimum speed requirement is ignored.

5. The method of claim 1, further comprising changing the remote application transaction identity to the transaction identifier.

6. The method of claim 5, further comprising:
   writing a return data stream addressed from the receiving application, the return data stream including the transaction identifier.

7. A method of tracing processing of software instructions associated with a transaction, the method comprising:
   receiving an application file prior to loading the application file onto an application server, the application file comprising a first routine comprising a set of data stream writing instructions configured to provide a data stream configured to access a remote application located on a remote server;
   processing the application file to add instrumentation instructions and to create an instrumentation file, the instrumented file comprising a second routine and a private static method, wherein:
      the second routine is programmed to invoke the private static method and includes a set of transaction identification writing instructions, the transaction identification writing instructions being configured to add a transaction identifier to the data stream;

the private static method comprises the set of data stream writing instructions and enables a stack setup sequence to be handled automatically;

reading a data stream provided by the remote application located on the remote application server;

determining whether the data stream includes a transaction identifier appended to the data stream;

setting a transaction identification of a process of the application file to the transaction identifier when the data stream includes the transaction identifier; and associating the transaction identifier with performance and diagnostic data of the remote application and the application file;

filtering the performance and diagnostic data of the remote application and the performance and diagnostic data of the application file based on a maximum call depth requirement such that performance data associated with a method called after the maximum call depth requirement is surpassed is ignored.

8. The method of claim 7, further comprising:

setting the transaction identification of the process to a unique transaction identifier when the transaction identifier is absent from the data stream.

9. The method of claim 7, further comprising:

writing log data associated with the process and including the transaction identifier.

10. The method of claim 7, further comprising:

appending the transaction identifier to a return data stream addressed to the remote application located on the remote application server.

11. The method of claim 7, further comprising:

writing the data stream; and appending the transaction identifier to the data stream, wherein the remote application located on the remote application server is configured to write the data stream and append the transaction identifier.

12. The method of claim 7, wherein the remote application is a Java application.

13. The method of claim 7, wherein the remote application is a .NET application.

14. A method of adding instrumentation instructions to provide for tracing capability of a computer executable application, the method comprising:

receiving an application file prior to loading the application file onto an application server, the application file including a first routine including a set of data stream writing instructions configured to provide a data stream configured to access a remote application located on a remote server;

processing the application file to add instrumentation instructions and to create an instrumented file, the instrumented file including a second routine and a private static method, wherein:

the second routine is programmed to invoke the private static method and includes a set of transaction identification writing instructions, the transaction identification writing instructions being configured to add a transaction identifier to the data stream;

the private static method includes the set of data stream writing instructions and enables a stack setup sequence to be handled automatically;

loading the instrumented file onto the application server;

reading a data stream provided by the remote application located on the remote server;

determining whether the data stream includes the transaction identifier;

setting a transaction identification of the application file to the transaction identifier when the data stream includes the transaction identifier;

associating the transaction identifier with performance data of the remote application and performance data of the application file; and filtering the performance data of the remote application and the performance data of the application file based on a maximum call depth requirement such that performance data associated with a method called after the maximum call depth is surpassed is ignored.

15. The method of claim 14, wherein the transaction identification writing instructions are configured to add the transaction identification to an end of the data stream.

16. The method of claim 14, wherein the second routine includes a set of instrumentation instructions configured to log performance data associated with performance of the second routine.

17. The method of claim 14, wherein the application file is a JAVA class file.

18. The method of claim 14, wherein the application file is a .NET assembly file.

* * * * *